G. H. ELLIS.
WATERPROOF INSULATING FIBER SHEET.
APPLICATION FILED OCT. 25, 1911.
1,116,045.
Patented Nov. 3, 1914.
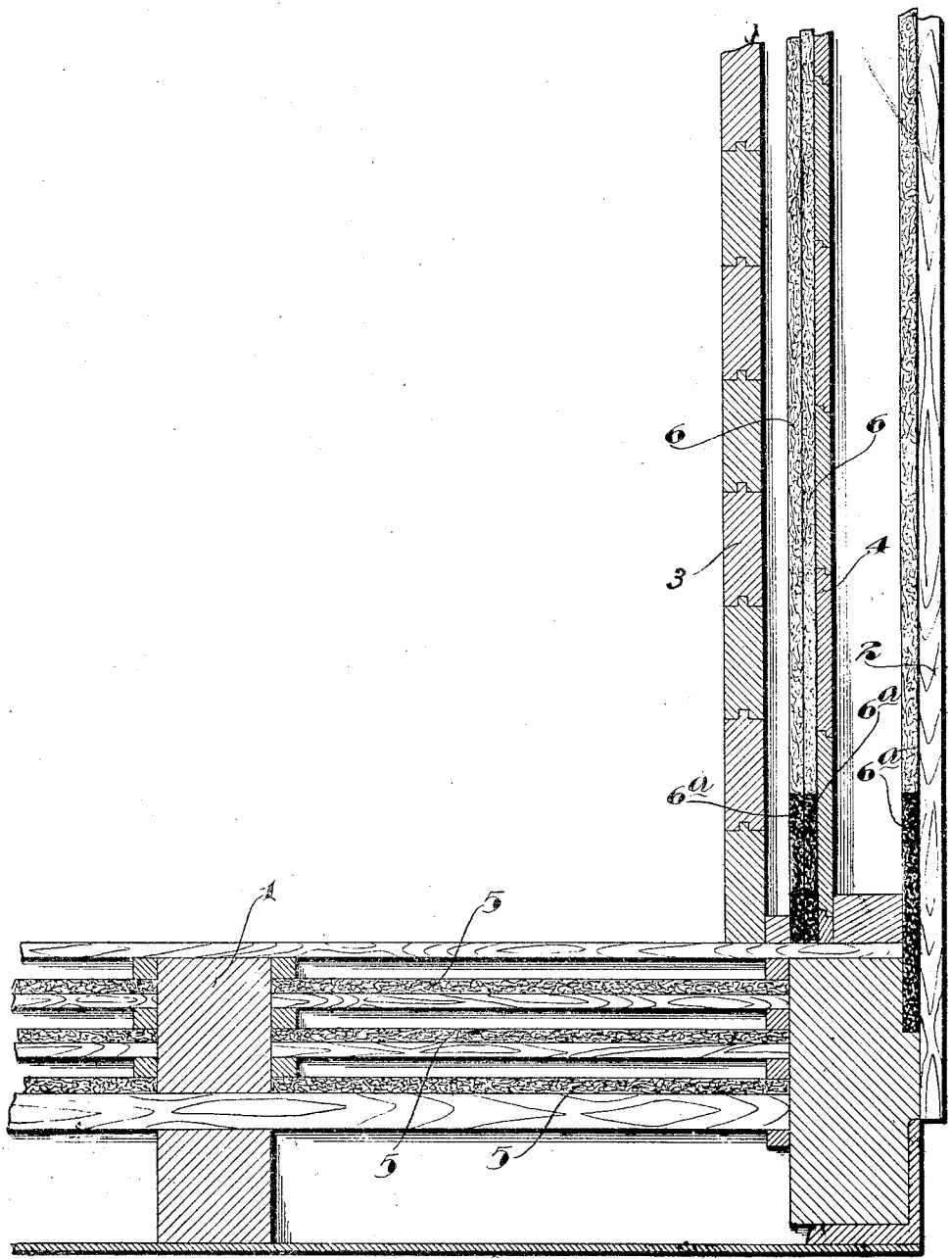
Witnesses:
E. C. Skinkle
A. H. Opsahl
Inventor:
George H. Ellis
By his Attorneys:
Williamson Merchant

UNITED STATES PATENT OFFICE.

GEORGE H. ELLIS, OF ST. PAUL, MINNESOTA.

WATERPROOF INSULATING FIBER SHEET.

1,116,045.  Specification of Letters Patent.  Patented Nov. 3, 1914.

Application filed October 25, 1911. Serial No. 656,760.

*To all whom it may concern:*

Be it known that I, GEORGE H. ELLIS, a citizen of the United States, residing at St. Paul, in the county of Ramsey and State of Minnesota, have invented certain new and useful Improvements in Waterproof Insulating Fiber Sheets; and I do hereby declare the following to be a full, clear, and exact description of the invention, such as will enable others skilled in the art to which it appertains to make and use the same.

My present invention is particularly directed to the improvement of heat insulating sheets or material made from vegetable or animal fiber, whereby it is rendered more efficient as an insulating material in refrigerators.

Fibrous insulating sheets of the above character have a very high heat insulating capacity, which is due partly to the tubular or cellular form of the fibers themselves, and partly to the very large number of air cells or dead air chambers formed in the body of the mass between the fibers thereof, and in which the air is caged. These fibrous sheets have their highest heat insulating quality when dry, at which time the greatest amount of air is caged in the myriads of cells in and between the fibers thereof. When such sheets become damp, their heat insulating quality is decreased, and when they are very wet or saturated with water, their heat insulating quality is nearly or completely destroyed. Even water proofing materials applied to the fibrous insulating sheets fill up the air cells thereof to a greater or less extent, thereby reducing the amount of dead air caged in the cells, and correspondingly decreasing the insulating efficiency of the sheets.

In the construction of refrigerator cars, and other portable and fixed refrigerators, it is now the common practice to interline the walls thereof with fibrous insulating sheets, such as flax felt or sheets of felted and intertangled flax or other vegetable or animal fibers. When these fibrous sheets are thus applied in refrigerators, the lower portions thereof come into contact with the water from the melted ice, and this water, by capillary attraction, is carried upward into the fibrous sheets making the same wet, nearly or quite throughout their entire bodies, and thus nearly or quite destroying their heat insulating quality.

I have found that I can overcome the above difficulties and keep the main body portions of the insulating sheets dry and the cells thereof filled with dead air, by treating only the portions which come into contact with the water, with a suitable water proofing material. By thus applying the water proofing material only to that portion of the fibrous sheet which comes into contact with the water, I obtain in the main body of the sheet, a maximum heat insulating quality and provide means for preventing water from being conducted thereto by capillary attraction; and furthermore, I obtain this at a minimum of cost. For instance, an insulating sheet of the above character, water proofed throughout, would not be as good an insulating material as the improved partially water proofed sheet, and at the same time, would cost much more.

The water proof material which I have used with great success is made up of a mixture of wax tailings and paraffin wax, in the proportions of 75 per cent. of the former with 25 per cent. of the latter. These waxes are mixed while in molten condition, and also are applied to the fiber sheets while in molten condition, either by dipping or by spraying, but preferably by the former treatment so that the edge or limited portion of the fibrous sheet of material will be treated through and through with the water proofing material. That portion of the fibrous board or felt which is thus treated with the water proofing material will not absorb water and the water will not be carried upward therethrough by capillary attraction, and hence, the untreated upper portion of the sheet or board will remain dry with open air cells and will maintain its maximum heat insulating efficiency.

In the single sheet of drawing, the invention illustrated is incorporated in a refrigerator car.

The expression 'refrigerator is herein used in a broad sense to include any and all kinds of refrigerating apparatus whether in the form of a car, an ice box, or other construction.

In the said drawings, the numeral 1 indicates the floor structure of the car body, the numeral 2 the outside sheathing, the numeral 3 the inside wooden lining or sheathing, and the numeral 4 the blind or intermediate wooden lining. The floor structure 1 is shown as provided with interposed sheets 5 of flax felt or similar fibrous sheets, but this feature constitutes no part of the present invention. The walls of the car body are, as shown, provided with interposed sheets 6 of flax felt or similar fibrous material. Preferably, the fibrous insulating sheets employed are of the character disclosed and claimed in Letters Patent 908,681, issued to James E. Lappen, of date, January 5th, 1909, and entitled "Flax felt." The lower portions of the felt sheets 6 marked 6ª, and shown in darker lines than the bodies of the said sheets, are saturated with the water proofing material, preferably composed of the materials above noted. These portions 6ª are the only portions which come into contact with water from the melting ice, which water runs from the floor through the various lower joints in the wall structure and has hitherto been the cause of making nearly the entire bodies of the wall insulating sheets wet or damp.

What I claim is:

1. A fibrous heat insulating sheet adapted for use as a sheathing in a refrigerator or like construction, and having that portion thereof which comes in contact with the water of the refrigerator treated with waterproofing material to prevent moistening of the entire sheathing by capillary action, but having the main body portion untreated with such waterproofing material whereby said body portion retains its maximum heat insulating properties.

2. A heat insulating sheathing for refrigerators and the like, comprising a plurality of fibrous heat insulating sheets, that portion of certain of said sheets which contacts with the water of the refrigerator being treated with a waterproofing material to prevent the entire sheathing being moistened by capillary action, the remaining portion of said sheets being untreated with said waterproofing material to maintain their maximum heat insulating properties.

3. A fibrous heat insulating sheathing for refrigerators and the like, having the lower edge portion thereof which contacts with the water of the refrigerator treated with waterproofing material to prevent moistening of the entire sheathing by capillary action, the upper main body portion of the sheathing being untreated with said material whereby the maximum heat insulating qualities of the main body portion are retained.

4. A fibrous heat insulating sheet adapted for use as sheathing for refrigerators and the like, and having a limited edge portion thereof which contacts with the water of the refrigerator treated with waterproofing material composed of wax tailings and paraffin wax to prevent the entire sheathing being moistened by capillary action, but having its main body portion untreated with or free from said waterproofing material, whereby the maximum heat insulating properties thereof are retained.

In testimony whereof I affix my signature in presence of two witnesses.

GEORGE I. ELLIS.

Witnesses:
BERNICE G. WHEELER,
HARRY D. KILGORE.